United States Patent [19]

Gregoire et al.

[11] Patent Number: 4,742,326
[45] Date of Patent: May 3, 1988

[54] DISC BRAKE ASSEMBLY HAVING AN ELECTRICAL LINING WEAR INDICATOR

[75] Inventors: Gabriel Gregoire, Asnieres Sur Oise; Robert Beilleau, Saint Ouen L'Aumone; Jean-Marc Dick, Epinay-Sur-Seine, all of France

[73] Assignee: General Motors Corporation, Detroit, Mich.

[21] Appl. No.: 880,184

[22] Filed: Jun. 30, 1986

[51] Int. Cl.⁴ ...................... B60T 17/22; F16D 66/02
[52] U.S. Cl. .................................. 340/52 A; 188/1.11
[58] Field of Search .......................... 340/52 A, 52 B; 188/1.11; 200/61.4, 61.44

[56] References Cited

U.S. PATENT DOCUMENTS

| | | | |
|---|---|---|---|
| 3,639,895 | 2/1972 | Wilhelmi | 340/52 A |
| 3,675,197 | 7/1972 | Bennett et al. | 340/52 A |
| 3,893,543 | 7/1975 | Sibatani et al. | 340/52 A X |
| 4,677,420 | 6/1987 | Topic et al. | 340/52 A |

FOREIGN PATENT DOCUMENTS 1284207 8/1972 United Kingdom .
1384492 2/1975 United Kingdom .

*Primary Examiner*—Joseph A. Orsino, Jr.
*Assistant Examiner*—Brian R. Tumm
*Attorney, Agent, or Firm*—D. D. McGraw

[57] ABSTRACT

A sliding-caliper disc brake assembly includes an H-shaped anti-rattle spring for a brake backing plate that is movable directly by a brake apply piston and an electrical lining wear indicator comprising a mounting portion molded from electrically insulating plastics material with an embedded loop of electrical contact wire fastened on to a central region of the anti-rattle spring. A leg of the mounting portion extends into a recess formed in a layer of friction material carried by the brake backing plate. The mounting block is formed with an internal recess a pair of lateral locating arms and a snap-over detent tongue for co-operation with the anti-rattle spring to ensure secure retention of the mounting portion in position on the spring.

6 Claims, 3 Drawing Sheets

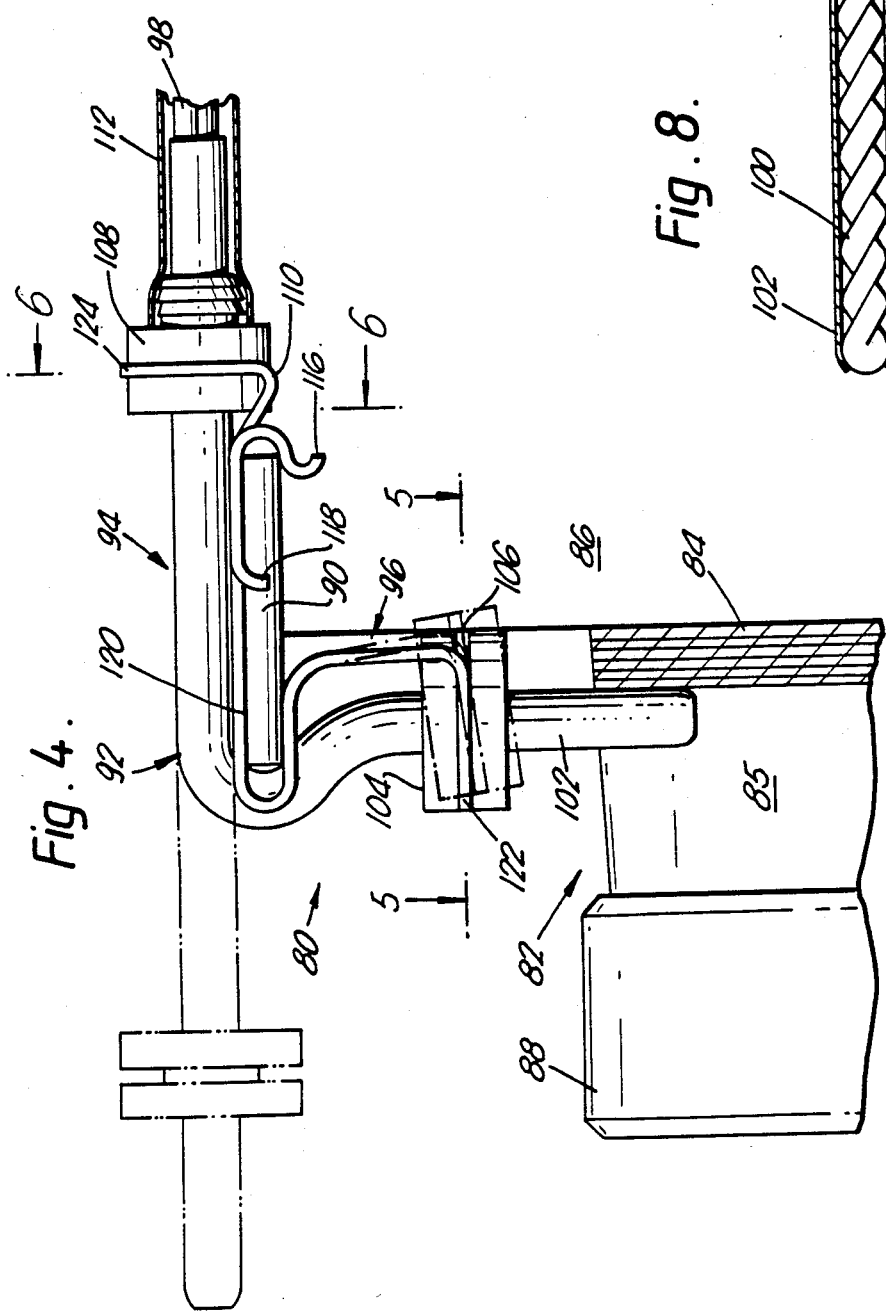
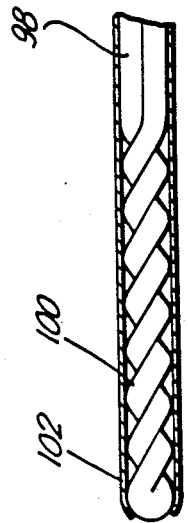

DISC BRAKE ASSEMBLY HAVING AN ELECTRICAL LINING WEAR INDICATOR

This application corresponds to British Patent Application No. 8516028, filed June 25, 1985.

This invention relates to a disc brake assembly having an electrical lining wear indicator.

The braking of a vehicle involves the dissipation of considerable amounts of energy, and the linings of the brakes are accordingly subject to considerable wear. Various types of lining wear indicators have been proposed, to give a ready indication of when the brake linings of a vehicle are so worn as to require replacement.

For example, U.S. Pat. No. 3,675,197 (Bennett et al) discloses an electrical type of lining wear indicator for use with a brake pad of a disc brake for a vehicle, in which a metal or plastics clip is secured to the backing plate of the brake pad and forms a support for a conductive sensor that is connected as part of an electrical circuit to provide an indication of excessive lining wear. The clip is formed with projections which engage the rear face of the backing plate to prevent the clip from being accidentally dislodged.

Other prior-proposed electrical lining wear indicators have involved the use of brake pads having backing plates formed with apertures to provide for the retention of the conductive sensor in its correct position relative to the backing plate and lining.

There is a need for an electrical lining wear indicator for a caliper-type disc brake which is not only easy to install but is also securely retained when in its operative position, and the use of which involves minimal change to the brake caliper and brake pad.

By the present invention there is provided a disc brake assembly having an electrical lining wear indicator, in which a brake pad comprising a layer of friction material carried by a backing plate is slidably mounted on a laterally spaced pair of mounting pins, an anti-rattle spring for the brake pad includes a central region engaged over an upper edge of the brake pad and a pair of oppositely extending resilient arms engaged under the respective mounting pins, and the lining wear indicator comprises an electrical conductor having a covering of electrically insulating material and including a detector portion that extends into a recess in the friction material of the brake pad, and a mounting for the electrical conductor including a support portion that extends over the backing plate and the anti-rattle spring and is fastened on to the anti-rattle spring to maintain the electrical conductor securely in position relative to the backing plate and retain the detector portion in position in the recess in the friction material of the brake pad.

With such a disc brake assembly it is possible to avoid making any change to the brake caliper to accommodate the lining wear indicator.

Preferably, in a disc brake assembly in accordance with the invention, the oppositely extending resilient arms of the anti-rattle spring comprise a first pair of opposed arms disposed adjacent one face of the backing plate, the anti-rattle spring also has a second pair of opposed arms for engagement with an opposite face of the backing plate, and the support portion of the mounting for the electrical conductor is formed with laterally extending opposed locating arms which are engaged over edge portions of the central region of the anti-rattle spring, between the arms of the first and second pair, to maintain the support portion of the mounting for the electrical conductor secure and centered relative to the anti-rattle spring.

The specification of our United Kingdom Pat. No. 1,563,405 discloses an H-shaped anti-rattle spring 90 of this general kind: the proposed fastening of the electrical lining wear indicator on to such an anti-rattle spring, in conformity with the present invention, can permit easy installation and secure retention of the mounting portion of the lining wear indicator. For this purpose, the mounting for the electrical conductor may include a recess in the support portion arranged to receive an edge portion of the central region of the anti-rattle spring, and may also include a resilient clip portion, for example comprising a resilient cantilever arm having a detent formed at a free end thereof, that is resiliently engageable over an opposite edge portion of the central region of the anti-rattle spring, to hold the support portion of the mounting for the electrical conductor securely in position on the anti-rattle spring.

There are various possibilities for installation of the electrical lining wear indicator, for example during assembly of the anti-rattle spring on the brake caliper production line, or alternatively at the end of the caliper production line when the anti-rattle spring is in place on the brake caliper. A further possibility is for the lining wear indicator to be installed when the brake caliper is being installed in a car or other vehicle.

The electrical conductor could simply comprise a piece of metal, but preferably comprises a contact wire, conveniently in the form of a loop having a pair of connecting lead portions connectible as part of an electrical warning circuit. The electrical warning circuit may include a source of electrical energy and an audible and/or visual warning device, such that when a predetermined thickness of the brake lining material has become worn away, by contact with a rotary brake disc, the contact wire is exposed and makes electrical contact with the brake disc to complete the electrical circuit and actuate the warning device.

It is also possible for the contact wire to be connected in series with a contact wire of at least one other disc brake assembly that is selectively operable for braking another respective road wheel of the vehicle, and also with a continuity-check switch which, when closed, completes an electrical circuit to energize an indicator device if there is electrical continuity through the contact wires. In this way an indication can be obtained of whether any of the wires are broken before the lining material of any of the brake pads has become worn to a predetermined minimum thickness. The indicator device used for this purpose may for example be the same warning device as is used to give an indication of excessive lining wear.

The mounting for the contact wire may comprise an L-shaped block of heat-resistant polytetrafluorethylene, or a thermoset (for example Bakelite) or other heat-resistant electrically insulating material, and include a leg portion accommodating the detector portion of the contact wire.

Such an L-shaped mounting block may be a relatively inexpensive one-piece molding of plastics material, which can easily be replaced if the electrical contact wire becomes worn through or broken. The use of a molded-in embedded electrical contact wire also tends to protect the wire from accidental damage.

It is alternatively possible to utilize a two-part construction for the electrical lining wear indicator, in which the covering of electrically insulating material for the contact wire extends throughout the length of the contact wire, and the mounting for the electrically insulated contact wire comprises a resilient retainer clip made of stainless steel or other heat-resistant material.

Such a two-part construction is potentially simpler to manufacture than the molded one-piece type of construction, and permits cost savings. Also, for replacement of the electrical lining wear indicator there is the possibility of re-using the stainless steel retainer clip. This two-part type of electrical lining wear indicator can be made functionally similar in its operation to the molded one-piece type.

The backing plate provided with the electrical lining wear indicator in conformity with the present invention may comprise part of a sliding-caliper type of disc brake assembly, in which for brake actuation the backing plate is engageable by the usual hydraulically actuated piston of the sliding-caliper assembly.

In the drawings:

FIG. 4 is a fragmentary elevational view, with parts in section, of a second embodiment of a disc brake assembly having an electrical lining wear indicator in accordance with the present invention, including an electrical conductor and a resilient retainer clip;

FIG. 8 is a detail view of a detector portion of the electrical conductor shown in FIG. 4.

Figure 1:
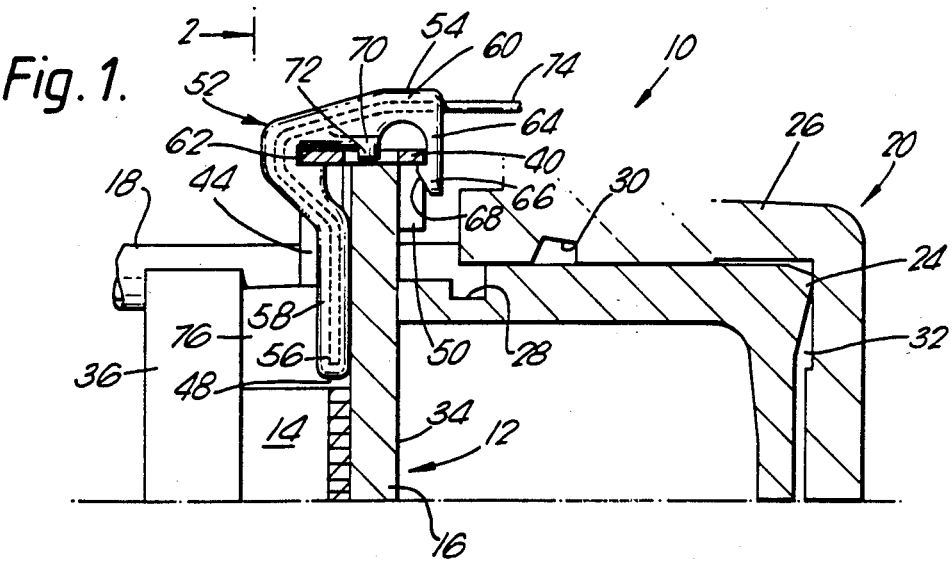
FIG. 1 is a fragmentary sectional view, with parts in elevation, of a first embodiment of a disc brake assembly having an electrical lining wear indicator in accordance with the present invention.
Figure 2:
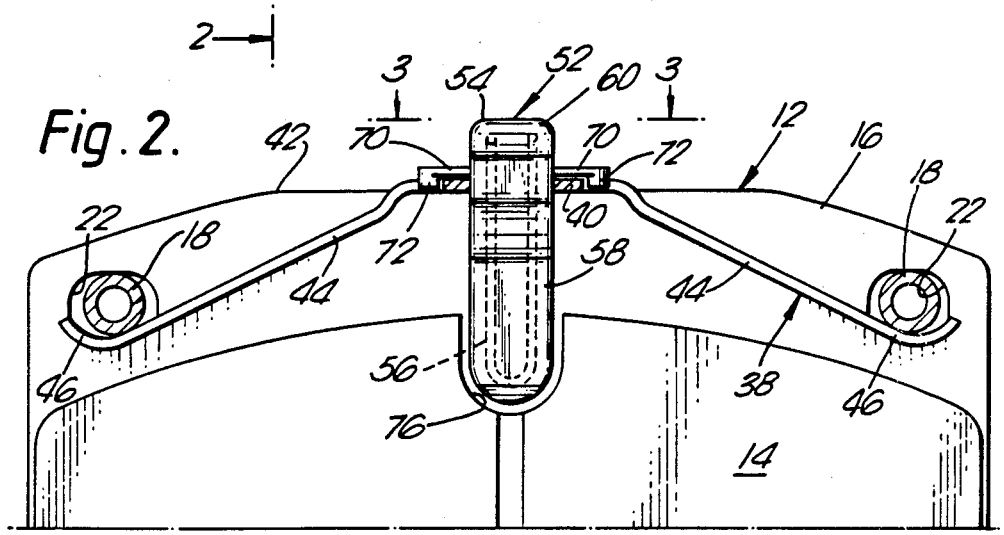
FIG. 2 is a fragmentary elevational view on the line 2—2 of FIG. 1, in the direction of the arrows.
Figure 3:
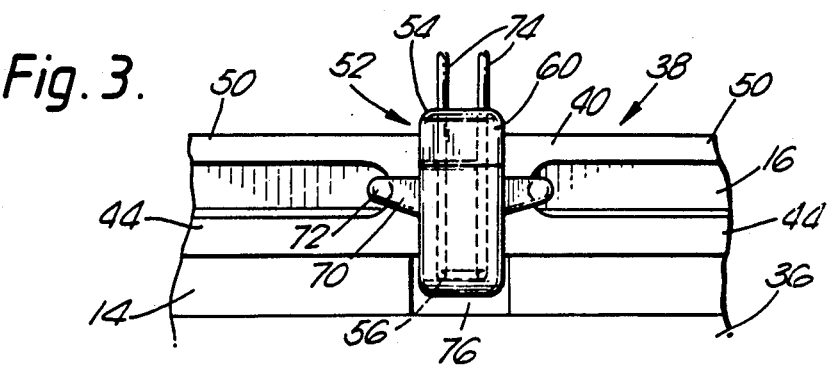
FIG. 3 is a fragmentary plan view on the line 3—3 of FIG. 2, in the direction of the arrows.

With references now to the drawings, in the first embodiment shown in FIGS. 1 to 3 a disc brake assembly 10 in accordance with the present invention for use in a motor vehicle is shown as being of the sliding-caliper type, having brake pads mounted in a slidably mounted brake caliper in a generally similar manner to what is disclosed in the specification of our United Kingdom Pat. No. 1,563,405.

More specifically, as is shown for example in FIGS. 1 and 2 of the present drawings, the disc brake assembly 10 includes a brake pad 12 which comprises a layer of friction material 14 carried by a brake backing plate 16. The backing plate 16 is slidably mounted on a laterally spaced pair of mounting pins 18 which extend from a caliper portion 20 of the assembly through respective apertures 22 in upper corner regions of the backing plate.

A cup-like hollow hydraulic piston 24 is slidably mounted in a cylinder portion 26 of the caliper, with conventional seals (not shown) being accommodated in circumferential grooves 28 and 30 in the piston and cylinder portion respectively, for fluid sealing and piston return. The introduction of hydraulic fluid through an inlet (not shown) into a hydraulic apply chamber 32 of the cylinder portion 26 causes the piston 24 to exert a force on the rear face 34 of the backing plate 16 and thereby move the brake lining constituted by the layer of friction material 14 into frictional braking engagement with a rotary brake disc 36 that is connected to rotate with one of the road wheels (not shown) of the vehicle.

To control vibratory movement of the brake pad 12 during vehicle movement, an H-shaped anti-rattle spring 38 is provided. The anti-rattle spring 38 has a central region 40 which engages an upper edge 42 of the brake pad 12, and a pair of oppositely extending resilient arms 44 having curved end portions 46 which are engaged under the respective mounting pins 18. The resilient arms 44 are slightly spaced from a front face 48 of the backing plate 16, and the anti-rattle spring 38 also includes a pair of oppositely extending resilient arms 50 which are shorter than the arms 44 and project from the central region 40 of the anti-rattle spring for engagement with the rear face 34 of the backing plate, such that the anti-rattle spring 38 is held securely relative to the caliper and the brake pad.

The construction as so far described is generally similar to what is disclosed in the specification of our United Kingdom Pat. No. 1,563,405. In conformity with the present invention the disc brake assembly 10 also includes an electrical lining wear indicator 52, which is fastened on to the anti-rattle spring 38 of the assembly.

More specifically, the electrical lining wear indicator 52 comprises an L-shaped mounting block 54 formed as a one-piece molding of electrically insulating plastics material, with an electrical conductor in the form of an electrical contact wire 56 having the shape of an elongate loop embedded in the plastics material during the molding operation. The mounting block 54 includes a generally straight leg portion 58 forming a detector portion, and also includes a support portion 60 which extends generally at right angles to the leg portion. At the junction of the leg portion 58 and the support portion 60, the mounting block 54 is formed with an internal recess 62 capable of receiving an edge portion of the central region 40 of the anti-rattle spring 38. The mounting block 54 also includes a resilient clip member comprising a resilient cantilever arm 64 which extends downwardly (as viewed in FIG. 1) from the free end of the support portion 60, the cantilever arm 64 being formed at a free end thereof with an inwardly projecting detent tongue 66 including a chamfered lead-in surface 68. The cantilever arm 64 and detent tongue 66 are dimensioned and positioned to permit engagement of the detent tongue over an edge portion of the central region 40 of the anti-rattle spring 38, between the two shorter resilient arms 50 of the spring.

The support portion 60 of the L-shaped mounting block 54 is further formed with a pair of laterally extending locating arms 70 which terminate in downwardly extending lug-like locating projections 72. The locating arms 70 act as outrigger arms performing a stabilizing and locating function for the mounting block 54, in that the arms are dimensioned to allow the locating projections to be engaged over the edge portions of the central region 40 of the anti-rattle spring 38, into the spaces formed between respective ones of the pair of resilient arms 44 and the shorter pair of resilient arms 50.

As is shown in FIGS. 1 and 3 of the drawings, the elongate loop of electrical contact wire 56 which is embedded in the electrically insulating material of the L-shaped mounting block 54 is provided with a pair of connecting lead portions 74 that project from the free end of the support portion 60 of the mounting block.

These connecting lead portions 74 can be connected as part of an electrical warning circuit (not shown) that also includes a source of electrical energy and an audible and/or visual warning device (such as a buzzer and/or a lamp).

In a vehicle equipped with more than one of these electrical lining wear indicators, for example on the disc brakes of each of a pair of road wheels of the vehicle, or on disc brakes for all the road wheels of the vehicle, the electrical contact wires of the various lining wear indicators can be connected in series with a continuity-check switch (not shown) which, when closed, completes an electrical circuit to energize an indicator device if there is electrical continuity through all the electrical contact wires.

As is best seen in FIG. 2 of the drawings, the closed end of the elongate loop of electrical contact wire 56 that is embedded within the material of the mounting block 54 extends to a position close to the free end of the leg portion 58. With the electrical lining wear indicator 52 fastened on the anti-rattle spring 38, as is best seen in FIG. 2 the free end of the leg portion 58 extends with clearance into a recess 76 that is formed centrally in the upper portion of the layer of friction material 14 of the brake pad 12.

The electrical lining wear indicator 52 can readily be fastened to, and removed from, the anti-rattle spring 38. Thus to fasten the lining wear indicator in position on the spring 38 (with the spring in position on the caliper), the L-shaped mounting block 54 is flexed slightly and applied to one edge of the central region 40 of the spring to allow the detent tongue 66 to pass over the upper surface of the central region of the spring until the edge portion of the central region of the spring is received within the internal recess 62 in the mounting block and the leg portion 58 of the mounting block lies against the front face 48 of the backing plate 16, with the free end of the leg portion accommodated with clearance in the recess 76 in the layer of friction material 14 of the brake pad 12. The detent tongue 66 can then be allowed to engage over the edge portion of the anti-rattle spring 38 between the shorter resilient arms 50 of the spring, and snap into position to retain the L-shaped mounting block 54 securely relative to both the spring 38 and the backing plate 16, with the locating projections 72 on the locating arms 70 co-operating with the anti-rattle spring to maintain the mounting block centered and level relative to the spring.

Removal of the lining wear indicator simply requires disengagement of the detent tongue 66 from the anti-rattle spring, followed by separation of the wear indicator from the spring.

In operation of the disc brake assembly, the supply of hydraulic fluid to the apply chamber 32 causes the piston 24 to bring the layer of friction material 14 of the brake pad 12 into frictional braking engagement with the rotary brake disc 36, to produce the usual sliding-caliper action for braking the associated road wheel of the vehicle. When lining wear becomes excessive, in that the thickness of the layer of friction material 14 constituting the brake lining is reduced to less than a predetermined minimum thickness value, during braking the rotary brake disc also abrades away the surface region of the leg portion 58 of the L-shaped mounting block 54, to expose the electrical contact wire 56 and thereby provide an electrical contact path between the contact wire and the rotary brake disc 36, for providing an electrically initiated indication that replacement of the respective brake pad 12 is required.

Replacement of the brake pad 12 involves removal of the mounting block 54, the mounting pins 18 and the anti-rattle spring 38, after which the brake pad itself can be removed. When a replacement brake pad is being fitted, a replacement L-shaped mounting block can readily be fastened on the anti-rattle spring.

In this first embodiment of the disc brake assembly in accordance with the present invention, the electrical lining wear indicator 52 is easy to install and is securely retained when in its operative position. In addition, the provision of the lining wear indicator involves no changes to the brake caliper.

A second embodiment of a disc brake assembly in accordance with the invention is shown in FIGS. 4 to 8 of the drawings. In this second embodiment the electrical lining wear indicator comprises two separate main elements, namely an insulated electrical conductor element and a resilient retainer clip element forming a mounting for the conductor element. Functionally, however, the electrical lining wear indicators of the respective embodiments are similar to each other, and they can be used in similar contexts.

In detail, with reference initially to FIG. 4 of the drawings, in this second embodiment a disc brake assembly 80 in accordance with the present invention includes a brake pad 82 comprising a layer of friction material 84 carried by a brake backing plate 86, the brake pad 82 being mounted on a laterally spaced pair of mounting pins (not shown) as in the first embodiment, and being selectively movable into frictional engagement with a rotary brake disc 88 by means of a hydraulic piston and cylinder arrangement (not shown) as in the first embodiment. The disc brake assembly 80 also includes an H-shaped anti-rattle spring 90 as in the first embodiment, and an electrical lining wear indicator 92 of two-part construction which is fastened on to the anti-rattle spring 90 of the assembly.

In this second embodiment of a disc brake assembly in accordance with the invention, the electrical lining wear indicator 92 comprises an elongate insulated electrical conductor element 94 and a separate resilient retainer clip element 96.

The electrical conductor element 94 comprises an electrical contact wire 98 having a covering of heat-resistant electrically insulating material which extends throughout the length of the contact wire. The contact wire 98 is in the form of an elongate loop having a twisted portion 100 forming a detector end region of the looped contact wire, as is shown in FIG. 8. A thermo-retractable sleeve 102 made of heat-resistant polytetrafluorethylene plastics material closely surrounds the twisted portion 100 and an adjacent length of the looped contact wire 98, and is effective to maintain the twisting of the wire and make it rigid. This thermo-retractable sleeve 102 is retracted during a wire assembly operation.

A first grommet 104 having a circumferential groove 106 is bonded to the thermo-retractable sleeve 102 adjacent the detector end region of the contact wire 98, and a second grommet 108 likewise having a circumferential groove is bonded to the thermo-retractable sleeve 102 in the region of the other end of the sleeve. The second grommet 108 includes a tubular extension 110 formed to provide three sharp-edged annular projections, as shown in FIG. 4. These three annular projections serve to locate and maintain in position a protective sleeve 112 of heat-resistant material which is spaced around an end region of the thermo-retractable sleeve 102 and extends to a connector end region (not shown) of the contact wire 98.

At the connector end region, the looped contact wire 98 terminates in a pair of connecting lead portions (not shown) which make electrical contact with respective terminals of a connector plug (also not shown), by means of which the contact wire 98 is connected to form part of an electrical warning circuit that includes a source of electrical energy such as the battery of the vehicle and a visual (and/or audible) warning device.

The length of the electrical conductor element 94 which includes the protective sleeve 112 is flexible, whereas the length of the electrical conductor element 15 which includes the thermo-retractable sleeve 102 is only bendable.

Figure 5:
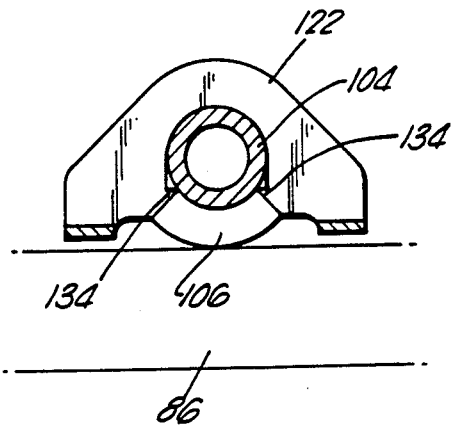
FIG. 5 is a view on the line 5—5 of FIG. 4, in the direction of the arrows.
Figure 6:
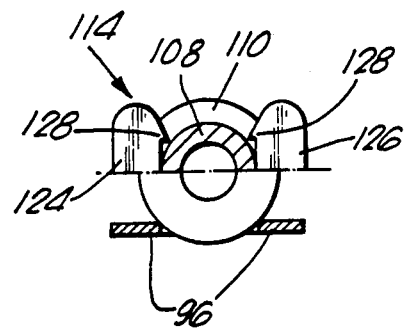
FIG. 6 is a view on the line VI—VI of FIG. 4, in the direction of the arrows.
Figure 7:
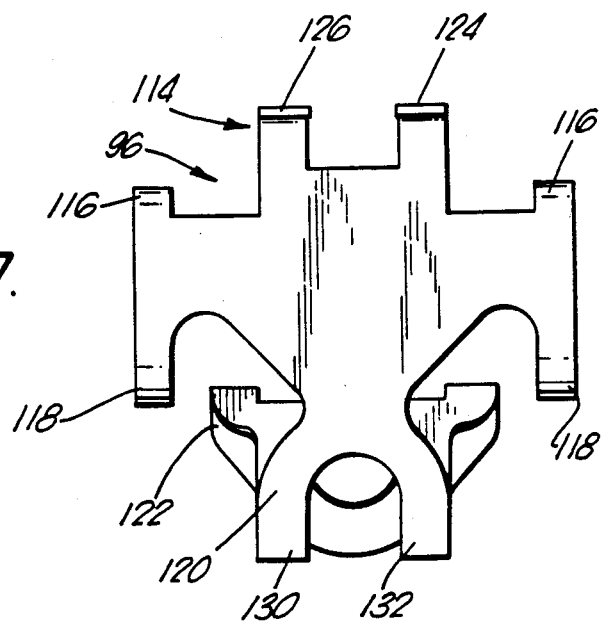
FIG. 7 is a top plan view of the resilient retainer clip shown in FIG. 4.

The resilient retainer clip element 96 is shown in top plan view in FIG. 8 and in section in FIG. 4 of the drawings, with respective end details being shown in FIGS. 5 and 6. The retainer clip element 96 is formed by bending the extremities of a generally cruciform stainless steel blank, to form an upstanding end portion 114 best seen in FIG. 6, a laterally spaced pair of downwardly bent clip portions 116, a laterally spaced pair of downwardly bent retainer portions 118, a U-bend recess portion 120, and a bent-over free-standing end portion 122 best seen in FIG. 5.

The upstanding end portion 114 comprises a laterally spaced pair of arms 124 and 126 provided with facing barb-like retainer projections 128. The downwardly bent clip portions 116 have a generally curved shape as shown in FIG. 4. The downwardly bent retainer portions 118 are shown in FIG. 4 as having a curved shape, or they could alternatively comprise downwardly bent straight tab-like portions. The U-bend recess portion 120 comprises a laterally spaced pair of like strips 130 and 132, each including parallel straight portions adjacent the actual U-bend. The free-standing end portion 122 has a generally C-shaped configuration forming a pair of facing barb-like retainer projections 134; the lateral regions of the free-standing end portion 122 form outrigger-like lateral stabilizer portions for the end portion 122 relative to the brake backing plate.

To assemble the electrical lining wear indicator of the second embodiment in place in the disc brake assembly, the resilient retainer clip element 96 is fastened on to the anti-rattle spring 90 by engaging one end region of the anti-rattle spring in the U-bend recess portion 120 of the retainer clip element and engaging the clip portions 116 of the retainer clip element over the opposite edge region of the anti-rattle spring. The retainer portions 118 act similarly to the lug-like locating projections 72 in the first embodiment.

The insulated electrical conductor element 94, which in its free state is straight in the region of the thermo-retractable sleeve 102, as shown in interrupted lines in FIG. 4, is bent around the anti-rattle spring, and thereupon retained in position by the retainer clip element 96, by introduction of the circumferentially grooved portion of the second grommet 108 between the arms 124 and 126 of the upstanding end portion 114 of the retainer clip element, for retention by the retainer projections 128, and introduction of the circumferentially grooved portion of the first grommet 104 into the interior of the C-shaped end portion 122 of the retainer clip element, for retention by the retainer projections 134, with the detector end region formed by the twisted portion 100 of the looped contact wire 98 being located in a recess 85 in the friction material 84 of the brake pad 82 in a manner corresponding to the relationship between the detector end region and the recess 76 which is shown in FIG. 2 in respect of the first embodiment.

In FIG. 4, the interrupted-line position of the detector end region of the insulated contact wire 98 illustrates an intermediate position of the detector end region during assembly.

During operation of this second embodiment of the disc brake assembly in accordance with the invention, when the insulating covering of the twisted portion 100 of the contact wire is worn through by the rotary brake disc, the warning device is connected by way of the brake disc to the vehicle's earth during braking, to generate an irregular warning signal. Then when the twisted contact wire portion becomes fully worn away, an open-circuit condition is produced, and a constant warning signal is generated.

The connector plug for the contact wire 98 may have three connector contacts, with the connecting lead portions of the contact wire being connected to first and second connector contacts of the connector plug and a shunt being connected across the second and third connector contacts of the connector plug, to make it possible to detect an incorrect connection in the vehicle's wiring.

This second embodiment of a disc brake assembly in accordance with the invention, utilizing the two-part electrical lining wear indicator 92, is potentially simpler to manufacture than the first embodiment, and permits cost savings, albeit providing a similar function.

The embodiments of the invention in which an exclusive property of privilege is claimed are defined as follows:

1. A disc brake assembly having a rotor and a caliper for braking said rotor, said caliper having a laterally spaced pair of mounting pins and a brake pad comprising a backing plate and a layer of friction material carried by said backing plate and slidably mounted on said laterally spaced pair of mounting pins, an anti-rattle spring for said brake pad including a central region engaged over an upper edge of the brake pad and a pair of oppositely extending resilient arms engaged under said respective mounting pins, an electrical lining wear indicator comprising:

a recess formed in the brake pad friction material; an electrical conductor having a covering of electrically insulating material and including a detector portion that extends into said recess and a mounting for said electrical conductor including a support portion that extends over said backing plate and said anti-rattle spring and is fastened on to the anti-rattle spring to maintain said electrical conductor securely in position relative to said backing plate and retain said detector portion in position in said recess so as to be engaged by the rotor upon sufficient friction material wear and detect such wear, said support portion of said mounting for said electrical conductor including a recess portion arranged to receive a first edge portion of said central region of said anti-rattle spring, and also including a clip portion that is resiliently engageable over a second, opposite edge portion of said central region of said anti-rattle spring, to hold said support portion of said mounting for said electrical conductor securely in position on said anti-rattle spring.

2. A disc brake assembly according to claim 1, in which said oppositely extending resilient arms of said anti-rattle spring comprise a first pair of opposed arms disposed adjacent one face of said backing plate, said anti-rattle spring also having a second pair of opposed arms for engagement with an opposite face of said backing plate, and said support portion of the mounting for said electrical conductor is formed with laterally extending opposed locating arms which are engaged over edge portions of said central region of said anti-rattle spring, between the arms of said first and second pair, to maintain said support portion of the mounting for said electrical conductor centered relative to said anti-rattle spring.

3. A disc brake assembly according to claim 1 in which said electrical conductor is in the form of a loop, and includes a pair of connecting lead portions for said electrical conductor which are adapted to be connected to form part of an electrical warning circuit.

4. A disc brake assembly according to claim 1 in which said electrical conductor comprises a contact wire.

5. A disc brake assembly according to claim 4, in which said covering of electrically insulating material extends throughout said length of said contact wire, and said clip portion of said support portion of said mounting for said electrically insulated contact wire comprises a resilient retainer clip made of heat-resistant material.

6. A disc brake assembly having a rotor and a caliper for braking said rotor, said caliper having a laterally spaced pair of mounting pins and a brake pad comprising a backing plate and a layer of friction material carried by said backing plate and slidably mounted on said laterally spaced pair of mounting pins, an anti-rattle spring for said brake pad including a central region engaged over an upper edge of the brake pad and a pair of oppositely extending resilient arm engaged under said respective mounting pins, an electrical lining wear indicator comprising:

a recess formed in the brake pad friction material; an electrical conductor comprising a contact wire and having a covering of electrically insulating material and including a detector portion that extends into said recess and a mounting for said electrical conductor including a support portion that extends over said backing plate and said anti-rattle spring and is fastened on to the anti-rattle spring to maintain said electrical conductor securely in position relative to said backing plate and retain said detector portion in position in said recess so as to be engaged by the rotor upon sufficient friction material wear and detect such wear, said mounting for said contact wire comprising an L-shaped block of heat-resistant electrically insulating material, and including a leg portion accommodating said detector portion of said contact wire.

* * * * *